United States Patent Office 3,154,105
Patented Oct. 27, 1964

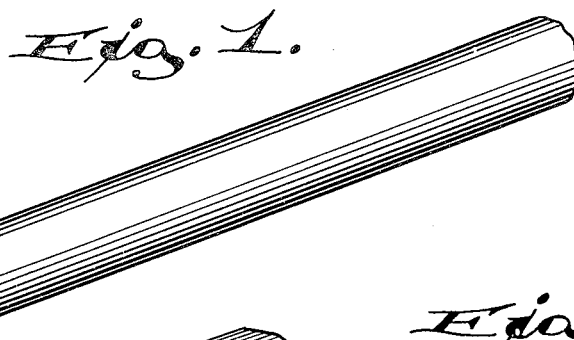
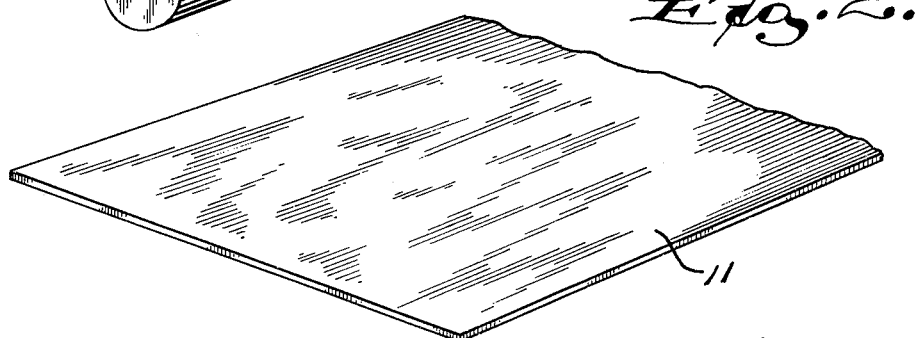
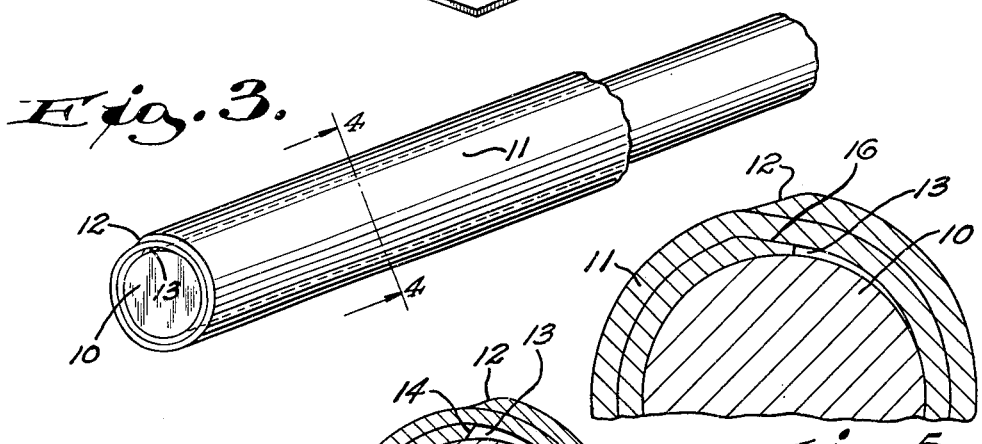
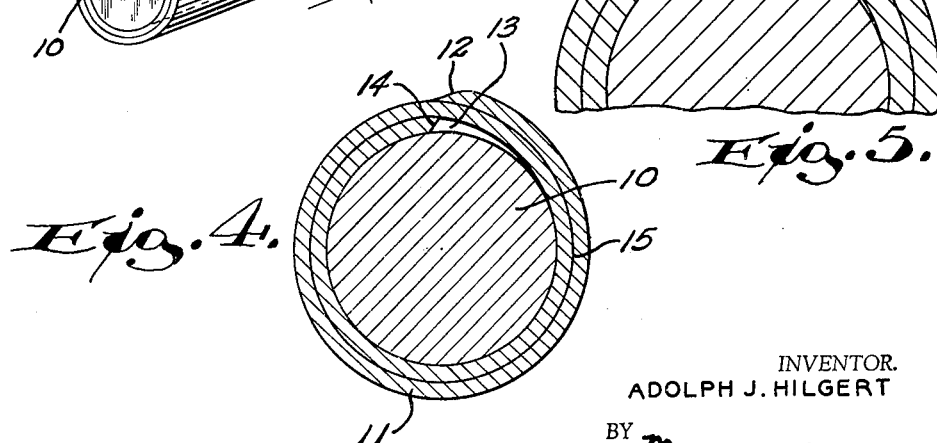
INVENTOR.
ADOLPH J. HILGERT
BY Morsell + Morsell
ATTORNEYS.

3,154,105
COMPENSATED CAPILLARY TUBING, AND
METHOD OF FORMING THE SAME
Adolph J. Hilgert, Milwaukee, Wis., assignor to Johnson Service Company, Milwaukee, Wis., a corporation of Wisconsin
Filed Oct. 20, 1961, Ser. No. 146,634
3 Claims. (Cl. 138—46)

This invention relates to improvements in compensated capillary tubing; and method of forming the same.

Temperature compensated capillary tubing finds use in various types of control equipment which may include an hydraulic element having a bulb section immersed in a fluid, the temperature of which fluid is to be sensed. The "head" of the hydraulic element is located in the control equipment instrument and is connected to the bulb by capillary tubing. A temperature increase in the bulb will cause an expansion of the liquid within the bulb and a consequent displacement of fluid into the capillary tubing. Thus, fluid is forced through the tubing into the element "head" and will react against a diaphragm to move the same and thereby actuate some mechanical part of the instrument, as a temperature operated switch or the like. Because the capillary tubing is not located in the sensed fluid, it is desirable to prevent temperature changes along the capillary tubing from producing changes in the volume of the fluid moved into or withdrawn from the "head" section of the instrument element. Any effect of the ambient temperatures around the capillary tubing on the fluid therewithin, will render the control mechanism inaccurate in its performance.

With the foregoing in mind, it is the primary object of the present invention to provide a compensated capillary tubing having a fluid passageway therein of small cross-sectional area and of novel shape, which cross-sectional area and shape is so proportioned that a temperature increase of the capillary tubing causes an increase in the cross-sectional area of the fluid space or duct in the tubing equal to the increase in the volume of the fluid.

A further object of the invention is to provide a compensated capillary tubing and method of forming the same wherein the tubing is such that when the ambient temperature surrounding the tubing causes the capillary fluid therein to expand, there is a simultaneous expansion of a portion of the tubing defining the capillary passageway or duct, thereby providing compensatory space in the passageway for the expanded fluid.

A further object of the invention is to provide a compensated capillary tubing and method of forming the same wherein the tubing is relatively inexpensive to fabricate, and the possibility of it developing leaks is effectively eliminated.

A further object of the invention is to provide a compensated capillary tubing which may be expeditiously produced in continuous lengths.

A further object of the invention is to provide a compensated capillary tubing and method of forming the same wherein the tubing has a capillary passageway or duct of uniform but small cross-sectional area and wherein the components of the tubing compensate for temperature changes anywhere along the length of the tubing.

A further object of the invention is to provide a compensated capillary tubing and method of forming the same which is commercially practical and which is efficient and is well adapted for the purposes described.

With the above and other objects in view, the invention consists of the improved compensated capillary tubing and method of forming the same, and the various parts, combinations and steps incident thereto, as set forth in the claims and all equivalents thereof.

In the accompanying drawing in which the same reference characters indicate the same parts in all the views:

FIG. 1 is a fragmentary perspective view, on an enlarged scale, of the metal core for the improved capillary tubing;

FIG. 2 is a fragmentary perspective view, on an enlarged scale, of a metallic sheet or strip with which the core of FIG. 1 is wrapped in a particular manner to provide the finished capillary tubing;

FIG. 3 is an enlarged fragmentary perspective view of the completed capillary tubing formed pursuant to the present invention;

FIG. 4 is a transverse sectional view taken on line 4—4 of FIG. 3 and on a larger scale; and FIG. 5 is an enlarged fragmentary sectional view showing an alternative method of controlling the effective size of the fluid duct.

Referring now more particularly to the drawing, it will appear that the core of the improved compensated capillary tubing is indicated by the numeral 10 and the same takes the form of an elongated rod, of any suitable length and of circular form in cross-section. Said rod is formed of a metal having a low co-efficient of thermal expansion such as "Invar."

The sheet material or strip which, in forming the capillary tubing, is wrapped about the core 10, is indicated by the numeral 11. The wrapping sheet 11 is formed of metal having a high co-efficient of thermal expansion such as 18-8 stainless steel or copper and portions may be coated with another metal to facilitate a subsequent furnace brazing or silver soldering to secure the convolutions to each other as at 15. The coating however, should be omitted from those portions which are next to the core so that there is no bonding to the core.

In forming the improved capillary tubing, the manner in which the sheet material or strip 11 is wrapped about the core rod 10 is highly important. As is shown in FIGS. 3 and 4, the strip material 11 is wrapped spirally about the core rod 10 and the outer free edge of the strip which is preferably beveled as at 12, is held down by the brazing or soldering of the strip 11. This method of wrapping the strip or sheet 11 about the metallic core 10 provides a longitudinal fluid duct 13 of substantially triangular form in cross-section and the inner end portion of the wrapped strip 11, forming a wall of the duct 13, may be angled or beveled as at 14.

When the capillary tubing of the form shown in FIGS. 3 and 4 is used in some type of control equipment, it may provide a fluid conducting conduit between the "head" of an hydraulic element acting against a diaphragm, and a fluid immersed bulb. The triangular shaped fluid duct 13 extending longitudinally of the core 10, between a peripheral portion thereof, and a convoluted portion of the wrapped strip 11, will be filled with the fluid. The major portion of the length of the capillary tubing is not, however, located in the sensed fluid and it is desirable to prevent temperature changes along the tubing from producing changes in the volume of the fluid which is moved into or withdrawn from the head section. In other words, it is necessary to prevent ambient temperature changes around the tubing from rendering the control mechanism inaccurate in its performance.

With the foregoing in mind, it should be pointed out that the co-efficient of expansion of the sheet 11 is such with respect to the co-efficient of expansion of the core 10 as to produce the desired compensation. Also, when the ambient temperature is below a predetermined point, the wrapping 11 is snug on the core with no compensation taking place. Any temperature increase in the region of the capillary tubing above said predetermined point will cause an increase in the cross-sectional area of the fluid-carrying duct 13 equal to the increase in the volume of fluid contained therewithin. This is true because of the selected high co-efficient of thermal expansion of the metal of the wrapping strip 11 and the selected low co-efficient for the core. The angle 14 on the inner edge of the wrapping strip 11, the thickness of the metal of said strip, and the material selected for the spiral wrapping and core, are all factors in determining, maintaining and controlling the shape and effectiveness of the fluid duct 13. In addition, further control is possible by tapering the thickness of the inner end edge as shown in FIG. 5 at 16.

In use the increase in the cross-sectional area of the effective fluid-carrying duct is brought about not only by an increase in the cross-sectional area of the space 13, but also by reason of the fact that expansion of the wrapping creates a small circumferential space between the wrapping and core which is added to the space 13.

The compensated capillary tubing produced pursuant to the present invention is of two pieces and, serving as a fluid transmitting capillary tubing in any ambient temperature, it is self-compensating and prevents improper reactions against a diaphragm or other devices connected with the capillary tubing. The improved capillary tubing is devoid of grooves or bores formed in the elements thereof, and the fluid duct is automatically provided by the space between a peripheral portion of the core rod and the over-lapping convolutions of the sheet 11. Obviously, the improved tubing is relatively inexpensive to fabricate and eliminates the possibility of leakage.

The improved compensated capillary tubing and method of forming the same is simple, novel, commercially practical and well adapted for the purposes described.

What is claimed as the invention is:

1. Compensated capillary tubing, comprising: an elongated solid core formed of material having a low coefficient of thermal expansion; and a sheet wrapped spirally about said core and having an inner edge adjacent said core and formed of material having a high co-efficient of thermal expansion and forming a fluid duct adjacent said inner edge which is between a smooth peripheral portion of the core and a portion of an inner convolution of the spirally wrapped sheet, the co-efficient of expansion of said sheet being such with respect to the co-efficient of expansion of the core that the cross-sectional area of said fluid duct will vary in response to the temperature of a surrounding fluid proportional to changes in the volume of fluid flowing through said duct.

2. Compensated capillary tubing, comprising: an elongated cylindrical core formed of solid metal having a low co-efficient of thermal expansion; and a sheet wrapped spirally about said core throughout the length of the latter and having an inner edge adjacent said core and formed of metal having a high co-efficient of thermal expansion, a fluid duct being formed adjacent said inner edge and between a smooth curved surface portion of the core and a portion of a convolution of the spirally wrapped sheet, said duct being of tapering cross-sectional shape in a circumferential direction, the coefficient of expansion of said sheet being such with respect to the co-efficient of expansion of the core that the cross-sectional area of said fluid duct will vary in response to the temperature of ambient air proportional to changes in the volume of fluid flowing through said duct.

3. Compensated capillary tubing, comprising: an elongated cylindrical core formed of solid metal having a low co-efficient of thermal expansion; and a sheet wrapped spirally about said core and having an inner edge adjacent said core and formed of metal having a high co-efficient of thermal expansion, surface portions of the convolutions of said sheet in mutual contact being secured together, there being formed adjacent said inner end edge and between a peripheral portion of the core and a portion of a convolution of the spirally wrapped sheet a fluid duct extending lengthwise of the wrapped core, which is substantially triangularly shaped in cross section, the cross-sectional size of which varies in response to the temperature of a surrounding fluid, said triangular shape being defined on one side by said inner end edge of the sheet, on another side by the inner surface of a convolution of the sheet and on the third side by a peripheral portion of the core.

References Cited in the file of this patent

UNITED STATES PATENTS

| | | |
|---|---|---|
| 1,237,031 | Haefely | Aug. 14, 1917 |
| 1,889,792 | Rosenburgh | Dec. 6, 1932 |
| 2,273,736 | Raymond et al. | Feb. 17, 1942 |
| 2,363,140 | Persons | Nov. 21, 1944 |
| 2,418,671 | Schweller | Apr. 8, 1947 |